United States Patent [19]
Kubota

[11] Patent Number: 4,688,972
[45] Date of Patent: Aug. 25, 1987

[54] TWIST DRILL

[76] Inventor: Masao Kubota, 2-22-7, Narimasu, Itabashi-ku, Tokyo, Japan

[21] Appl. No.: 844,384

[22] Filed: Mar. 26, 1986

Related U.S. Application Data

[63] Continuation-in-part of Ser. No. 630,706, Jul. 13, 1984, abandoned.

[30] Foreign Application Priority Data

Aug. 20, 1985 [JP] Japan .................................. 60-181034

[51] Int. Cl.[4] .............................................. B23B 51/02
[52] U.S. Cl. ...................................... 408/230; 408/227
[58] Field of Search ............... 408/227, 229, 230, 223, 408/224

[56] References Cited

U.S. PATENT DOCUMENTS

| | | | |
|---|---|---|---|
| 1,467,491 | 9/1923 | Oliver | 408/230 |
| 2,778,252 | 1/1957 | Oxford, Jr. | 408/230 |
| 3,564,947 | 2/1971 | Maier | 408/211 |
| 3,779,664 | 12/1973 | Caley et al. | 408/230 |
| 4,556,347 | 12/1985 | Barish | 408/230 |
| 4,605,347 | 8/1986 | Jodock et al. | 408/230 |

OTHER PUBLICATIONS

"Machining Data File", vol. 2, 1979, p. 17/20, issued by Kikai Gijutsu Shinko Kyokai.
"Practical Tool Theater", by Masanori Rujitomi, published by Komine Kogyo Shuppan K.K., 1978, pp. 66-69.
"Tool Engineer Handbook", Second Edition, published by McGraw-Hill Book Co., Inc. 1959, pp. 28-24 and 28-25.

Primary Examiner—Gil Weidenfeld
Assistant Examiner—Daniel W. Howell
Attorney, Agent, or Firm—Merchant, Gould, Smith, Edell, Welter, Schmidt

[57] ABSTRACT

In a twist drill in which the outer portion in each of the chisel edge lines at the drill point is made permanently efficient in cutting by a wall surface of an additional inner groove united to the original flute, an improvement resides in that the inner portion thereof adjacent to the center also functions as an efficient cutting edge in creating a built-up edge deposited over a specified resting face of a narrow triangular shape close to the center, in which the resting face is bordered by the inner portion and an intersecting curve passing through an intermediate point in the chisel edge line, whereby a permanent cutting effect is achievable all over the length of each of the chisel edge lines in regrinding the drill point.

1 Claim, 8 Drawing Figures

TWIST DRILL

CROSS-REFERENCE TO RELATED APPLICATION

This is a continuation-in-part of application Ser. No. 630,706 filed on July 13, 1984, now abandoned.

BACKGROUND OF THE INVENTION

1. Field of the Invention

This invention relates to a twist drill having specific chisel edges at its point, more particularly to a twist drill subjected to less drilling thrust, offering good cutting quality in a cutting operation, and having sufficient strength and rigidity.

2. Description of the Prior Art

In conventional twist drills, various types of web thinning have been adopted for the drill points in order to reduce excess drilling thrust and to improve the cutting quality of chisel edges not having thinning cuts. Web thinning involves two types:

(1) diminishing the chisel edge, and
(2) providing a new rake surface to the chisel edge.

In the former, the length of the thinning cut is one-half to three-fourths that of the cutting lip. The cut therefore extends far up the top end of the flute. The average distance of the thinning cut may be one-fourth to one-half of the drill diameter. It is also often recommended to extend the thinning out to the extreme edge in order to change the shape of the chip. In this case, a selectively positive or negative rake is rendered at the full length of the cutting edge.

In the latter as well as most of the former, reconditioning of worn and dull drills takes too much time and skill and it is not so effective. Also, with web thinning, after regrinding the drill point, the troublesome thinning cut operation must be carefully repeated.

SUMMARY OF THE INVENTION

The object of this invention is to eliminate the above-mentioned disadvantages. The present invention aims to make available permanent chisel edges with an invariable and efficient rake surface, i.e., chisel edges in which repeated regrinding of the drill point does not change the rake surface at all. By merely regrinding the point of a dull drill, the same and higher drilling effect can be obtained comparing with a conventional drill having web thinning cuts. Therefore, troublesome thinning cut work can be eliminated.

According to the present invention, there is provided a twist drill characterized in that each of the chisel edges at the drill point is provided with a narrow region of a negative rake surface which is composed of a part of the clearance surface of the opposite cutting lip, and further with a specific twisted wall surface functioning as a secondary positive rake surface thereof and efficient in cutting, which is defined as an additional interior helical groove united to the original helical groove so as to extend principally over the full length of the drill body and to have the same lead of helix as the original helical groove of the drill body. It is preferable that the intersecting corners of the lips forming the main cutting edge and the chisel edge be chamfered or rounded off.

BRIEF DESCRIPTION OF THE DRAWINGS

The invention will be better understood from the following description of preferred embodiments taken in connection with the accompanying drawings, in which.

DESCRIPTION OF THE PREFERRED EMBODIMENTS

Figure 1:
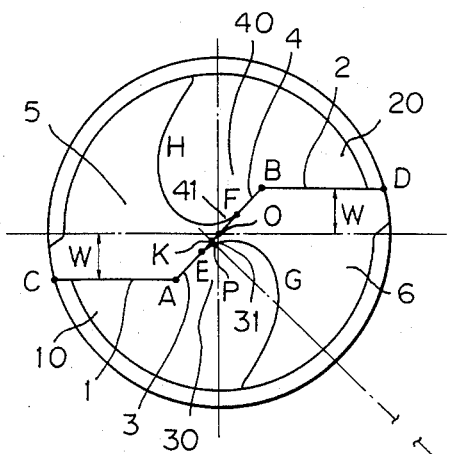
FIG. 1 is a plan view of the point of a two-flute drill, showing the configuration of cutting edges according to the present invention.
Figure 2:
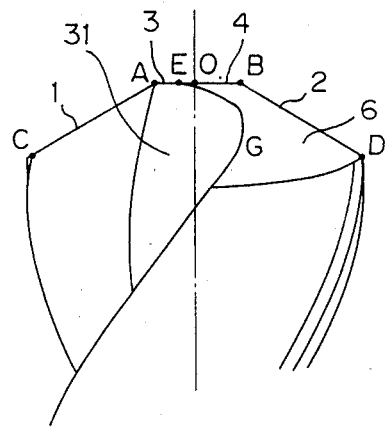
FIG. 2 is an enlarged side elevational view of the point shown in FIG. 1.

Referring to FIGS. 1 and 2, reference character O indicates the center of the point of a two-flute drill. Main cutting edges or cutting lips 1 and 2 stretch along lines AC and BD, respectively, extending from the outer end of the chisel edge to the periphery of the drill. Chisel edges 3 and 4 are defined as approximately straight lines AO and BO, comprising narrow triangular regions for the relief surfaces 6, 5 of the opposite lips 2, 1 and part of the wall surfaces of the helical grooves 31, 41 separated by curved edges EG, FH from the region.

Figure 3:
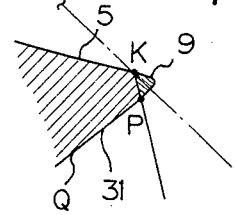
FIG. 3 is a partial cross-sectional view through point K in a chisel edge line, which view is included in a plane parallel to the axis of the drill, illustrating the formation of a secondary rake surface made to the chisel edge and a built-up edge created over a part of the relief surface of the opposite lip in drilling work.

The cross-sectional view given in FIG. 3 illustrates one section of the combined rake surfaces, including an optional point K in the inner chisel edge $\overline{EO}$. Line $\overline{KP}$ remains as the primary rake surface having a minus rake angle with regard to the inner chisel edge $\overline{EO}$. Line $\overline{PQ}$ is included in the axial twisted wall surface 31 having a positive rake angle.

If line $\overline{KP}$ is short enough, a built-up edge 9 with effective cutting action may be created over the region, thereby protecting the chisel edge from becoming dull. Returning to FIG. 1, the greater part of the narrow region including line $\overline{KP}$ serves as a stable seating face for depositing the hard built-up edge. Further, the built-up edge is smoothly connected to the secondary rake surface having the positive rake angle with an efficiently sharp cutting edge.

Since the chisel edge is given the above-mentioned primary as well as secondary rake surfaces, whenever the point of the drill becomes dull and the relief surface of the lips is reground, the predetermined accurate rake surfaces of the chisel edge are constantly obtained.

The provision of the above-mentioned chisel edge rake surface reduces the thickness of the web near the center to some extent, but does not reduce so much the overall strength and rigidity of the drill since the radii of curvature in section rendered over the interior twisted wall surface is designed to be appropriately small.

Consequently, when regrinding a coated drill according to the present invention, the coating of the secondary rake surfaces remains unground.

On the other hand, as the chisel edge has efficient cutting characteristics and reduced drilling axial thrust, the drill can be designed for a larger amount of offset W of the cutting lip line and, thus, a greater length of the chisel edge. The design of lips having a larger offset W means an increase of the web thickness, resulting in greater strength and rigidity of the drill. An appropriate design can more than compensate for the reduction of strength and rigidity of the drill due to the partial removal of material around the web for the formation of the interior helical grooves.

Another advantage of the present invention relates to chip formation. During drilling process using normal twist drills, a long continuous chip often winds up around the drill, making chip disposal difficult. However, when using the drill according to the present invention, this problem is eliminated. Test results show that, even when drilling holes in ductile workpieces such as steel, the twist drill of the present invention produces chip fragments rather than long chips. As to the mechanism behind this fragmentation in actual cutting, it is believed that two different types of chips, one from the lips and the other from the chisel cutting edges, are produced. These are believed to flow in a slightly different direction, thereby interfering with each other and thereby fragmenting.

In contrast with most of today's twist drills with web-thinning, the thinning cut is limited to the chisel edge area at the web end of the drill in consideration of not decreasing the stiffness of the drill. Due to this, the present invention solves various problems around the chisel edge in one stroke. This is, the formation of interior groove walls for producing a permanent positive rake surface to the chisel edge occurs principally over the full length of the flute in length. Strictly speaking, the secondary rake angle is slightly negative in the portion closely adjacent to the center O, but in most region it is positive. In addition, the bottom of the groove is located near the axis of the web.

Generally, most twist drills are made with webs which slightly increase in thickness toward the shank. In the invention, if a large offset W of the lip is selected, it is not always necessary to provide such a tapered web. If the taper is still desired, however, the interior helical groove should be formed so as to have a twisted curving surface tangential to a slightly conical surface of the tapered web and so as to gradually increase the web thickness extending toward the shank.

The cutting edge lines of the lip and the chisel edge make an obtuse angle at the crossing corner. In order to prevent damage to the cutting edges, such as breakage of a sharp portion at the crossing corner, it is preferable that the crossing corner between the lip and the chisel edge be finished by rounding off or chamfering, as is the practice in the design of general machining tools. In that case, of course, the rake surface corresponding to the, for example, chamfered portion is defined as another twisted wall surface smoothly joined to both the lip and chisel edge wall surfaces in which the axial lead length of those helical grooves are all the same.

Figure 4:
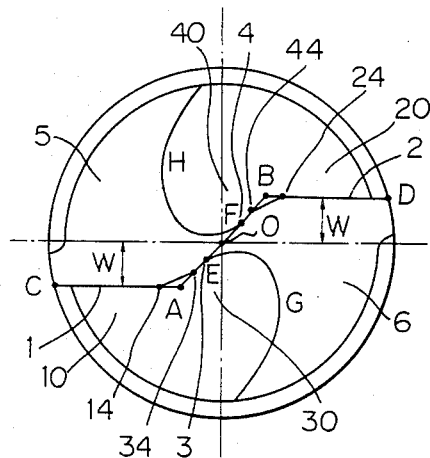
FIGS. 4 and 5 are views similar to those of FIGS. 1 and 2, respectively, wherein intersecting corners between the lip cutting edge and the chisel edge are shaped as chamfered lines.
Figure 5:
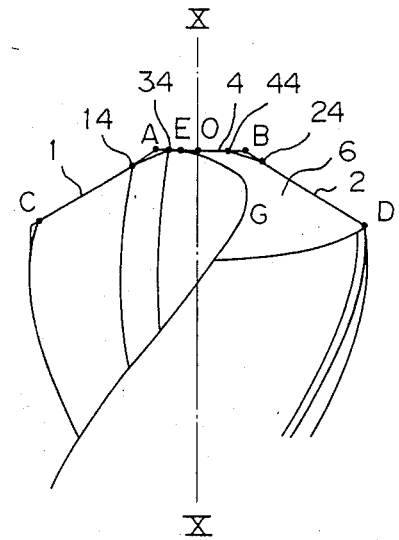

FIGS. 4 and 5 illustrate an embodiment of the joining corner connected by a chamfered portion having a comparatively larger width of chamfer. As shown in FIG. 4, the chamfered portion is contoured by a straight line segment cutting off the corner between the lip line and the chisel edge line. That is to say, on the lower side of the horizontal axis, the portion stretching from point 14 in the lip line 1 to point 34 in the chisel edge line 3 and, on the upper side thereof, the portion stretching from point 24 to 44 function as intermediate effective cutting edges. The length of $\overline{A-14}$ may be not always be equal to the length of $\overline{A-34}$, and this is the same for $\overline{B-24}$ and $\overline{B-44}$.

The length of the chisel edge after chamfering then becomes smaller than the original length as shown in sections, $\overline{O-34}$ and $\overline{O-44}$. In addition, as the chamfered portions 34—14 and 44—24 is inclined to the drill axis X—X, during drilling work, there is the advantage that the drill thrust pressure is decreased and the centripetal force is increased, resulting in increased centering stability of twist drill.

In the special case of the drill shown in FIGS. 4 and 5 in which points 34 and 44 may coincide with E and F, respectively, in addition, if $\widehat{14-E}$ and $\widehat{EG}$ have a common tangent plane at point E, as well as $\widehat{24-F}$ and $\widehat{FH}$ at F, a ridge line passing through intermediate points E and F disappears, and the groove profile is simplified and easily manufactured.

Figure 6:
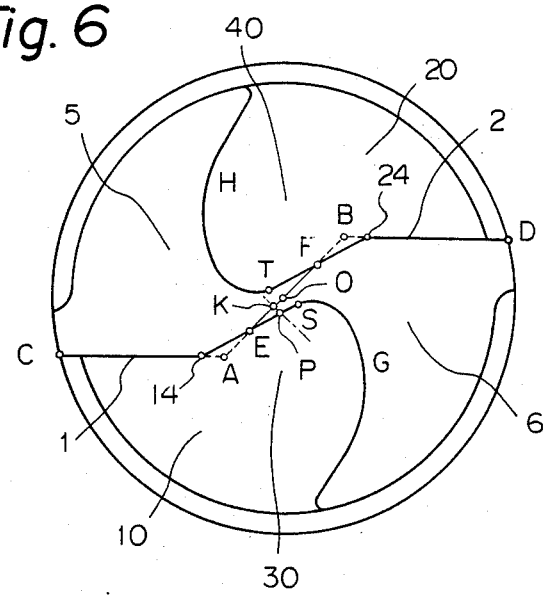
FIGS. 6, 7, and 8 relate to a special case of the twist drill shown in FIGS. 4 and 5.
Figure 8:
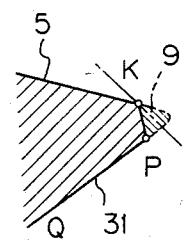
Figure 7:
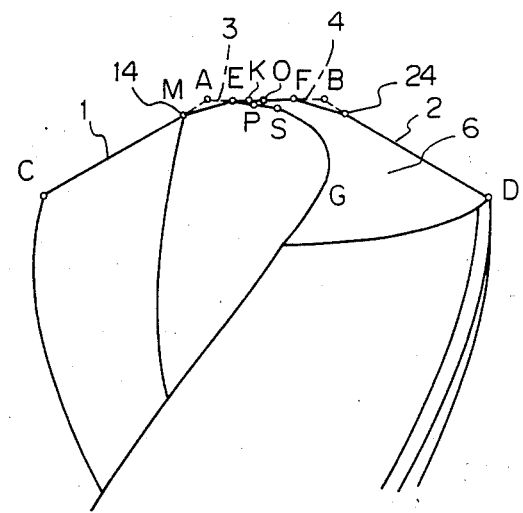

FIGS. 6, 7, and 8 which also was recited in Japanese patent application No. 60-181034 filed by the same applicant on Aug. 20, 1985, illustrate a modification of the twist drill shown in FIGS. 4 and 5. In the modification, an intersecting angle between the original chisel edge line $\overline{AO}$ or $\overline{BO}$ and the tangential plane of the curve $\widehat{ES}$ or $\widehat{FT}$ at the points E or F, where the points S and T are closely adjacent to the centre O, is limited to thirty degrees at maximum in practice, and is preferably below ten degrees, thus forming the narrow triangular resting region for creating the built-up edge thereover.

With respect to the formation of the interior helical groove in the chisel edge, the grooves are preferably formed over the full length of the drill. However, if a larger strength is desired, they may be limited to the middle of the drill.

I claim:

1. In a twist drill, an improvement in which with respect to an outer portion in each chisel edge line (AO,BO) at the drill point there is an additional inner helical groove (30,40) permanently efficient in cutting and united to an original helical flute, the improvement being characterized in that a cutting effect at an inner portion (EO,FO) of each chisel edge line adjacent to a center (O) of the drill is produced by formation of a hard built-up cutting edge (9), wherein with respect to the said inner portions (EO,FO) a secondary additional inner helical groove wall surface (32,41) having a same lead of helix as an original associated flute is formed in a secondary rake surface for the inner chisel portions, said grooves being extended to a vicinity of the center on a clearance surface of an opposite cutting lip passing through an associated intermediate point (E,F) dividing outer and inner portions of the associated chisel edge line; and wherein a seating face (KPO) suitable for creating the built-up edge (9) is provided with a narrow triangular region consisting of a primary rake surface (KP) of negative rake angle which is bordered by the inner portion (EO) and an intersecting curve between the additional innermost helical groove and a rearward clearance surface (6) of an opposite main cutting lip (2).

* * * * *

UNITED STATES PATENT AND TRADEMARK OFFICE
CERTIFICATE OF CORRECTION

PATENT NO. : 4,688,972

DATED : August 25, 1987

INVENTOR(S) : Masao Kubota

It is certified that error appears in the above-identified patent and that said Letters Patent is hereby corrected as shown below:

Col. 4, line 49, delete "32" and insert --31--.

Signed and Sealed this

Twenty-fourth Day of January, 1989

Attest:

DONALD J. QUIGG

Attesting Officer

Commissioner of Patents and Trademarks